United States Patent
Yang et al.

(10) Patent No.: US 9,502,889 B2
(45) Date of Patent: Nov. 22, 2016

(54) CONTROLLER AREA NETWORK NODE TRANSCEIVER

(71) Applicant: MYSON CENTURY, INC., Hsinchu (TW)

(72) Inventors: Tsen-Shau Yang, Hsinchu (TW); Yuan-Chih Chung, Hsinchu (TW)

(73) Assignee: Myson Century, Inc., Hsinchu (TW)

( * ) Notice: Subject to any disclaimer, the term of this patent is extended or adjusted under 35 U.S.C. 154(b) by 0 days.

(21) Appl. No.: 14/555,914

(22) Filed: Nov. 28, 2014

(65) Prior Publication Data

US 2015/0085411 A1    Mar. 26, 2015

Related U.S. Application Data

(63) Continuation-in-part of application No. 14/037,705, filed on Sep. 26, 2013, now abandoned.

(30) Foreign Application Priority Data

Jul. 29, 2013    (TW) .............................. 102127040 A

(51) Int. Cl.
| | |
|---|---|
| *H02H 9/02* | (2006.01) |
| *H04L 12/26* | (2006.01) |
| *H04L 12/64* | (2006.01) |

(52) U.S. Cl.
CPC ............... *H02H 9/02* (2013.01); *H02H 9/025* (2013.01); *H04L 12/6418* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 5,020,135 A | 5/1991 | Kasparian et al. | |
| 5,883,378 A * | 3/1999 | Irish | G01N 35/00871 250/214 A |
| 5,999,389 A * | 12/1999 | Luebke | H04L 69/40 361/67 |
| 6,324,044 B1 | 11/2001 | Teggatz et al. | |
| 6,381,714 B1 * | 4/2002 | Tomita | G06F 11/221 714/712 |
| 6,446,867 B1 * | 9/2002 | Sanchez | G01R 31/002 235/454 |
| 8,094,688 B2 * | 1/2012 | Kishigami | H04L 1/24 370/245 |
| 8,279,883 B2 * | 10/2012 | Diab | H04L 12/40032 370/389 |
| 2004/0043739 A1 | 3/2004 | Jordanger et al. | |
| 2005/0225389 A1 * | 10/2005 | Koyasu | H03F 3/45085 330/252 |
| 2006/0170451 A1 | 8/2006 | Jordanger et al. | |
| 2008/0116992 A1 | 5/2008 | Kishigami | |

FOREIGN PATENT DOCUMENTS

DE    10341514    4/2005

OTHER PUBLICATIONS

Office Action issued May 25, 2015 for the counterpart Taiwan application 102127040.

(Continued)

*Primary Examiner* — Crystal L Hammond
(74) *Attorney, Agent, or Firm* — WPAT, P.C., Intellectual Property Attorneys; Anthony King

(57) ABSTRACT

A transceiver includes a control module and a transceiving module. The control module is configured to generate a control signal in response to a signal from a micro-control unit. The transceiving module is integrated with the control module. The transceiving module is configured to, in response to the control signal, broadcast a first electrical signal to a bus and receive a second electrical signal from the bus.

20 Claims, 13 Drawing Sheets

(56) References Cited

OTHER PUBLICATIONS

Brief translation of the Office Action issued May 25, 2015 for the counterpart Taiwan application 102127040.
Office Action issued on Feb. 14, 2016 for the China counterpart application 201310375919.4.
Search report issued on Feb. 14, 2016 for the China counterpart application 201310375919.4.
English abstract translation of the Office Action issued on Feb. 14, 2016 for the China counterpart application 201310375919.4.
Office Action issued on Aug. 9, 2016 for the Taiwan counterpart application 104139606.
Search report issued on Aug. 9, 2016 for the Taiwan counterpart application 104139606.
English abstract translation of the Office Action issued on Aug. 9, 2016 for the Taiwan counterpart application 104139606 and DE 10341514.

\* cited by examiner

CONTROLLER AREA NETWORK NODE TRANSCEIVER

CROSS REFERENCE TO RELATED APPLICATIONS

This application is a Continuation-In-Part of pending U.S. patent application Ser. No. 14/037,705, filed Sep. 26, 2013 and entitled "CONTROLLER AREA NETWORK NODE TRANSCEIVER."

TECHNICAL FIELD

The present disclosure is generally related to a transceiver and, more particularly, to a controller area network (CAN) node transceiver.

BACKGROUND

Development of a controller area network (CAN) began in the 1980s and was published by the International Organization for Standardization (ISO). CAN is applied under harsh conditions of electrical transmitting for providing a stable transmission. Therefore, a CAN is usually applied on, for example, a control system of vehicles, aerospace, maritime, industrial automation and medical equipment. In case a signal wire of a differential bus is broken, grounded, or connected to a power cord, a CAN utilizes a two-wire differential transmitting protocol for continually providing signals.

A CAN includes a controller, which transmits signals of a micro-control unit (MCU) to a transceiver. The transceiver then broadcasts the signals over a bus. Moreover, the controller is integrated with the MCU by, for example, a digital process, in an electronic device. However, since the transceiver belongs to an analog component, it is difficult to integrate the transceiver with the controller in an electronic device.

The present disclosure provides a CAN node transceiver that includes a transceiver and a controller integrated with each other in a single chip.

SUMMARY

Embodiments of the present disclosure provide a transceiver. The transceiver includes a control module, and a transceiving module. The control module is configured to generate a control signal in response to a signal from a micro-control unit. The transceiving module is integrated with the control module, and is configured to, in response to the control signal, broadcast a first electrical signal to a bus and receive a second electrical signal from the bus.

In an embodiment, the transceiver is coupled to the bus via a first isolator and a second isolator, and the first isolator and the second isolator are disposed externally to the integrated control module and transceiving module.

In another embodiment, the transceiving module includes a first switch and a second switch.

In yet another embodiment, the first switch includes a first transistor, and the second switch includes a second transistor.

In still another embodiment, the first isolator is coupled between the first switch and the bus, and is configured to isolate a first spike current sent over the bus.

In yet still another embodiment, the second isolator is coupled between the second switch and the bus, and is configured to direct a second spike current to ground.

In a further embodiment, the first isolator includes a diode, which includes an anode coupled to the first switch and a cathode coupled to the bus.

In further another embodiment, the second isolator includes a diode, which includes an anode coupled to the bus and a cathode coupled to the second switch.

In further yet another embodiment, the transceiver includes a multiplexer. The multiplexer is coupled between the control module and the transceiving module. The multiplexer is configured to select a signal transmission direction between the control module and the transceiving module.

In further still another embodiment, the transceiving module includes an overheat protection module coupled to a driver.

In further yet still another embodiment, the overheat protection module is configured to disable the driver when the driver reaches a temperature threshold.

Some embodiments of the present disclosure provide an electronic device. The electronic device includes a transceiver, a first isolator and a second isolator. The transceiver includes a control module and a transceiving module. The control module is configured to generate a control signal in response to a signal from a micro-control unit (MCU). The transceiving module is integrated with the control module, and is configured to, in response to the control signal, broadcast a first electrical signal to a bus and receive a second electrical signal from the bus. The first isolator is disposed externally to the integrated control module and transceiving module, and coupled between the transceiver and the bus to isolate a first spike current sent over the bus. The second isolator is disposed externally to the integrated control module and transceiving module, and coupled between the transceiver and the bus to direct a second spike current to ground.

In an embodiment, the transceiver includes a first switch and a second switch.

In another embodiment, the first switch includes a first transistor and the second switch includes a second transistor.

In yet another embodiment, the electronic device further includes a multiplexer. The multiplexer is coupled between the control module and the transceiving module. The multiplexer is configured to select a signal transmission direction between the control module and the transceiving module.

In still another embodiment, the multiplexer is configured to establish a signal loop for testing the control module in response to a signal from the micro-control unit.

In yet still another embodiment, the first isolator includes a diode, which includes an anode coupled to the first switch and a cathode coupled to the bus.

In a further embodiment, the second isolator includes a diode, which includes an anode coupled to the bus and a cathode coupled to the second switch.

In further another embodiment, the transceiving module includes an overheat protection module coupled to a driver.

In further yet another embodiment, the overheat protection module is configured to disable the driver when the driver reaches a temperature threshold.

With the transceiving module and control module integrated with each other, a Serial Peripheral Interface (SPI) bus or an Inter-Integrated Circuit ($I^2C$) bus can be adopted for communications between the MCU and the electronic device. As a result, a designer has more selections to select the types of MCUs.

Moreover, control modules and transceiving modules can transmit signals to each other in fewer signal wires. Therefore, cost is reduced. With the control module integrated with the transceiving module, the software or MCU that would otherwise be updated in the existing approaches can be used in the communication system 400, while the electronic device 40A becomes more cost effective.

Additionally, the transceiving module is not integrated with isolators, and therefore there is no need to adopt the special process

BRIEF DESCRIPTION OF THE DRAWINGS

Details of one or more embodiments of the disclosure are set forth in the accompanying drawings and the description below. Other features and advantages of the disclosure will be apparent from the description, drawings and claims.

DETAIL DESCRIPTION

Figure 1:
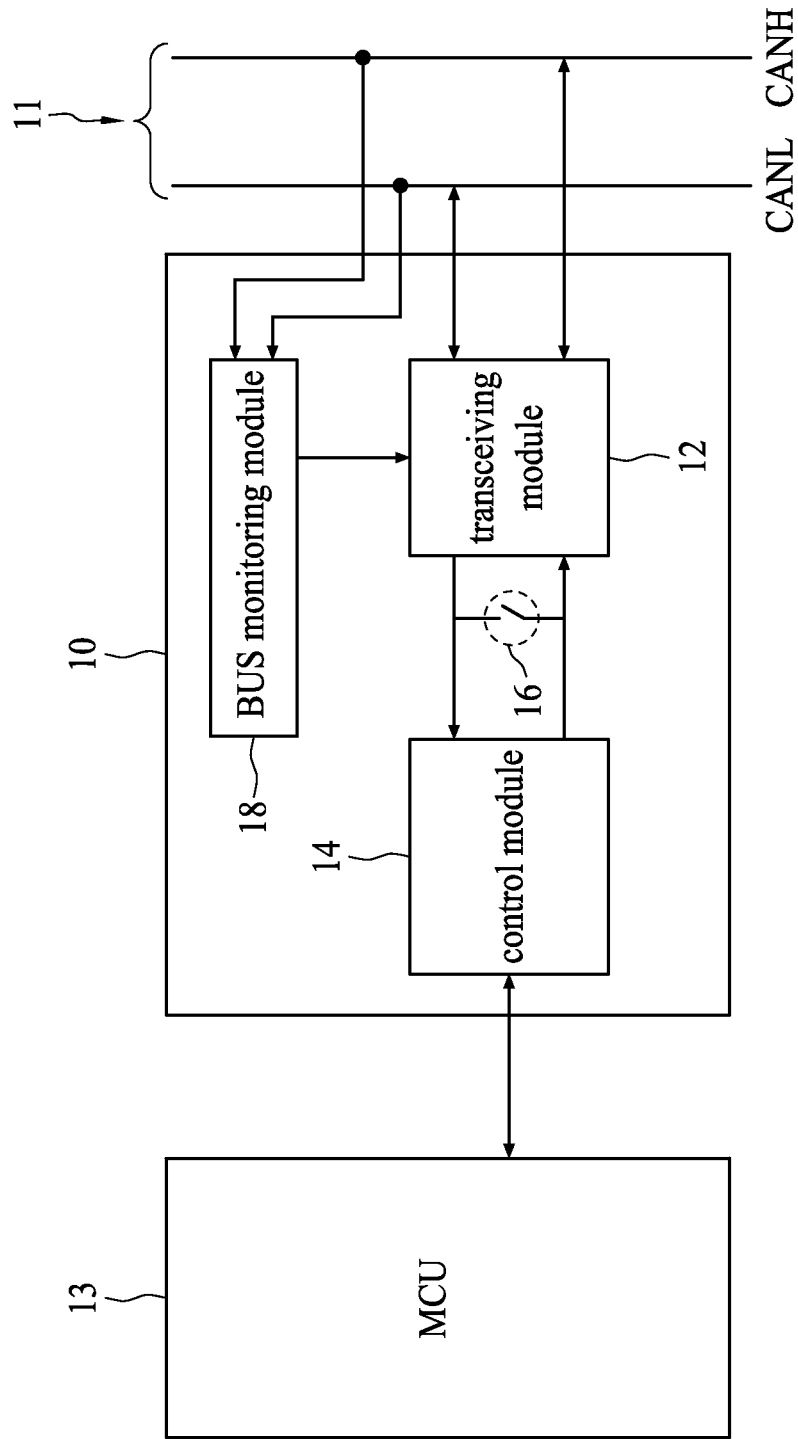
FIG. 1 is a block diagram illustrating an interaction among an electronic device, an MCU and a bus in accordance with an embodiment of the present disclosure.

Embodiments or examples of the disclosure illustrated in the drawings are now described in specific languages. It will nevertheless be understood that no limitation of the scope of the disclosure is thereby intended. Any alterations and modifications in the described embodiments, or any further applications of principles described in this document are contemplated as would normally occur to one of ordinary skill in the art to which the disclosure relates. Reference numerals may be repeated throughout the embodiments, but this does not necessarily require that feature(s) of one embodiment apply to another embodiment, even if they share the same reference numeral.

FIG. 1 is a block diagram illustrating an interaction among an electronic device 10, a micro-control unit (MCU) 13 and a bus 11 in accordance with an embodiment of the present disclosure. The electronic device 10 includes a high-speed control area network (CAN) transceiver, which may operate at a transmitting speed that is faster than 125 kilobits per second (Kb/sec). The electronic device 10 and the MCU 13 may together be termed as electronic control unit (ECU). The bus 11 includes a CAN high voltage channel CANH and a CAN low voltage channel CANL. The electronic device 10 is configured to electrically communicate with other ECUs over the bus 11.

In some embodiments, as shown in FIG. 1, the electronic device 10 includes a transceiving module 12, a control module 14, a switch 16, and a bus monitoring module 18. The control module 14 includes digital components. The transceiving module 12 includes analog components. The control module 14 and the transceiving module 12 are intergraded by, for example, a complementary metal-oxide-semiconductor (CMOS) process, into the electronic device 10. The CMOS process includes the use of, for example, a poly-silicon layer and four metal layers for 0.18 to 0.25 micrometer (μm) and 1.8 to 40 volts (V) applications.

In some embodiments, the electronic device 10 is equipped with a capability of fault tolerance for shorting a current of the CANH channel to a working voltage $V_{DD}$ and shorting a current of the CANL channel to the ground.

The bus monitoring module 18 is configured to compare a positive voltage signal of the CANH channel with a reference voltage to determine whether the CANH channel violates a CAN protocol. Moreover, the bus monitoring module 18 is configured to compare a negative voltage signal of the CANL channel with the reference voltage to determine whether the CANL channel violates the CAN protocol. The bus monitoring module 18 transmits a signal with a logic level to the transceiving module 12 in order to disable the transceiving function of the transceiving module 12 when either one of the CANH channel and the CANL channel violates the CAN protocol.

The switch 16 is located between a first signal transmitting path from the control module 14 to the transceiving module 12, and a second signal transmitting path from the transceiving modules 12 to the control module 14. When the transceiving function of the electronic device 10 is found abnormal due to, for example, a missing acknowledgement of an electrical signal transmitted by the control module 14, the MCU 13 may output a signal with a logic level to conduct the switch 16. Therefore, a signal loop which serves as a signal testing loop for the MCU 13 is formed, including a signal outputting terminal of the control module 14, the conducted switch 16 and a signal receiving terminal of the control module 14.

Figure 2:
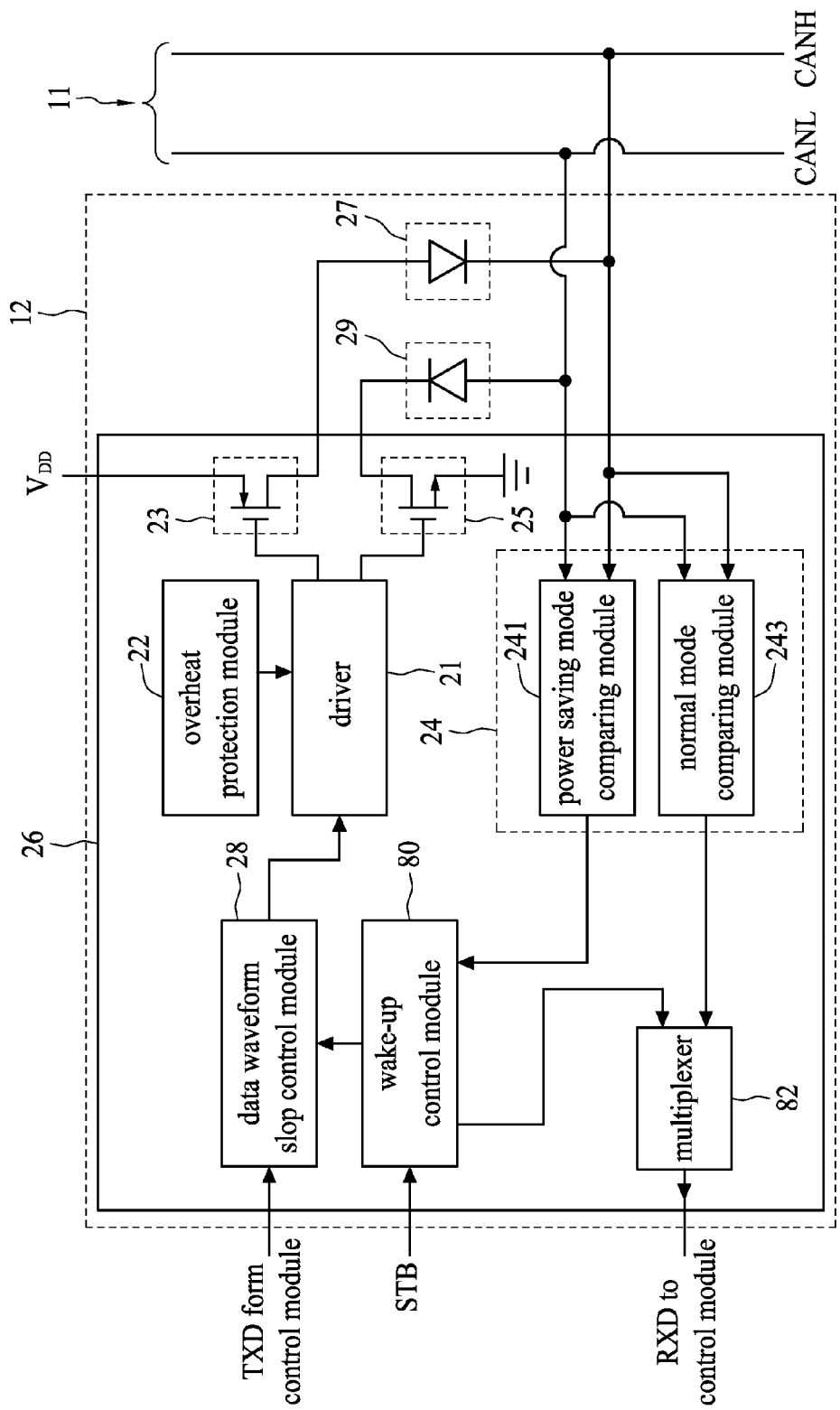
FIG. 2 is a schematic diagram of a transceiving module in accordance with an embodiment of the present disclosure.

FIG. 2 is a schematic diagram of a transceiving module 12 in accordance with an embodiment of the present disclosure. As shown in FIG. 2, the transceiving module 12 includes a transceiving unit 26, a first isolator 27 and a second isolator 29. The transceiving unit 26 includes a driver 21, a first switch 23, a second switch 25, an overheat protection module 22, a voltage comparing module 24, a data waveform slop control module 28, a wake-up control module 80, and a multiplexer 82.

The overheat protection module 22, coupled to the driver 21, is configured to provide an overheat protection mechanism. The overheat protection mechanism is triggered to disable functions of the driver 21 when a surface temperature of the driver 21 reaches, for example, approximately 170 degrees Celsius.

The first switch 23 in some embodiments includes a transistor, such as a P-type metal-oxide-semiconductor field-effect transistor (MOSFET). A source of the P-type MOSFET is coupled to a working voltage $V_{DD}$. The second switch 25 in some embodiments includes another transistor, such as an N-type MOSFET. A source of the N-type MOSFET is coupled to ground. Gates of the MOSFETs are coupled to the driver 21. Moreover, the maximum withstanding voltage of the first switch 23 and the second switch 25 is approximately 40 V.

The first isolator 27 in some embodiments includes a first diode. The first isolator 27 is external to the transceiving unit 26. Moreover, the first isolator 27 is coupled between the first switch 23 of the transceiving unit 26 and the CANH channel. The first isolator is configured to isolate a spike current coming from the CANH channel.

The second isolator 29 in some embodiments includes a second diode. The second isolator 29 is external to the transceiving unit 26. Moreover, the second isolator 29 is coupled between the second switch 25 of the transceiving unit 26 and the CANL channel. The second isolator 29 is configured to direct a spike current from the CANL channel, via the second switch 25, to ground.

As shown in FIG. 2, the anode of the first diode is coupled to the drain of the P-type MOSFET, and the cathode of the first diode is coupled to the CANH channel of the bus 11. The anode of the second diode is coupled to the CANL channel of the bus 11 and the cathode of the second diode is coupled to the drain of the N-type MOSFET. The first diode and the second diode are configured to provide a protection mechanism for the transceiving module 12. The protection mechanism prevents the P-type MOSFET and the N-type MOSFET of the transceiving module 12 from being damaged by a spike current from the bus 11.

Operation of the protection mechanism is described as follows. The bus 11 in a vehicle is liable to a positive spike current or a negative spike current, which may occur during igniting the engine of the vehicle, when the vehicle is hit by lightning, or in the discharge of static charge. In the case of a positive spike current event, the positive spike is isolated by the first diode 27 so that the first switch 23 is not damaged. In the case of a negative spike current event, the negative spike is directed to ground via the second diode 29 so that the second switch 25 is not damaged.

Moreover, as shown in FIG. 2, the voltage comparing module 24 includes a power saving mode comparing module 241 and a normal mode comparing module 243. Internal resistance of the power saving mode comparing module 241 and the normal mode comparing module 243 is adapted to prevent the voltage comparing module 24 from damage during a spike current event. In some embodiments, the power saving comparing module 241 includes an operational amplifier, and the normal mode comparing unit 243 includes another operational amplifier.

In normal operation, also referring to FIG. 1, the MCU 13 sends a working signal to the control module 14. The control module 14 generates a control data signal in response to the working signal, and sends the control data signal to the data waveform slop control module 28. In some embodiments, the data waveform slop control module 28 includes a resistor-capacitor (RC) circuit, and is configured to modify the waveform of the control data signal. The modified control data signal is then outputted to the driver 21.

Meanwhile, the wake-up control module 80 outputs a signal with a high logic level to the data waveform slop control module 28 in order to maintain the working ability of the data waveform slop control module 28. In some embodiments, the driver 21 outputs a signal with a low logic level to the P-type MOSFET and a signal with a high logic level to the N-type MOSFET in order to turn on the MOSFETs. As the P-type MOSFET is turned on, the CANH channel and an input terminal of the normal mode comparing unit 243 are pulled up to approximately the working voltage $V_{DD}$ via the conducted P-type MOSFET and the first isolator 27.

In addition, the negative voltage signal on the CANL channel of the bus 11 is transmitted to another input terminal of the normal mode comparing unit 243.

The working voltage $V_{DD}$ and the negative voltage signal are compared by the normal mode comparing unit 243. A signal with a logic level is then generated in response to the comparison result and is transmitted to the control module 14 via the multiplexer 82. The control module 14 generates a control signal in response to the signal with a logic level and transmits the control signal to the MCU 13.

Moreover, if a key of a car is removed for a certain amount of time after off ignition or if the MCU 13 enters into a power saving mode, the MCU 13 transmits a standby control signal to the control module 14. The control module 14 then enters into the power saving mode and transmits a standby signal STB to the wake-up mode control module 80. The wake-up mode control module 80 generates a signal with a low logic level in response to the standby signal STB to disable the data waveform slope control module 28. Since the data waveform slope control module 28 stops working, the driver 12 does not receive the control data signal from the data waveform slope control module 28. The driver 21 then enters into the power saving mode.

Furthermore, if the MCU 13, the control module 14 and the transceiving module 12 stay at the power saving mode and the voltage signals of the bus 11 are received by the transceiving module 12, the power saving mode comparing unit 241 compares a positive voltage signal from the CANH channel and a negative voltage signal from the CANL and generates a comparison result. The wake-up control module 80 generates a signal with a high logic level in response to the comparison result from the power saving mode comparing unit 241, and enables the data waveform slope control module 28.

The signal with a high logic level from the wake-up control module 80 is transmitted to the control module 14 to enable the control module 14. The control module 14 generates a wake-up control signal in response to the signal with a high logic level from the power saving mode comparing module 241, and enables the MCU 13.

Figure 3:
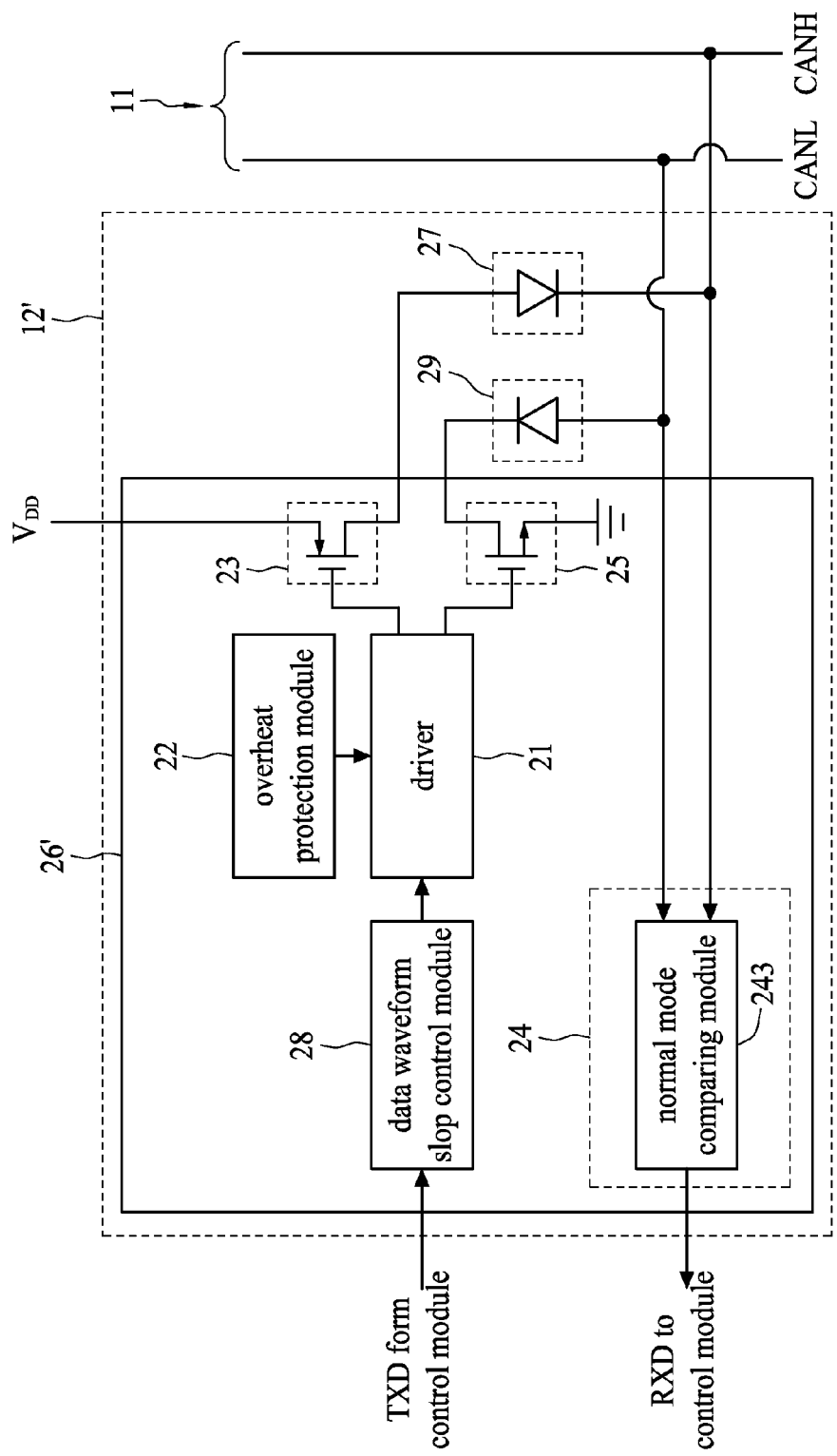
FIG. 3 is a schematic diagram of a transceiving module in accordance with another embodiment of the present disclosure.

FIG. 3 is a schematic diagram of a transceiving module 12' in accordance with another embodiment of the present disclosure. As shown in FIG. 3, the transceiving module 12' includes a transceiving unit 26' in addition to the first isolator 27 and the second isolator 29. The transceiving unit 26' includes the driver 21, the first switch 23, the second switch 25, the overheat protection module 22, the voltage comparing module 24, and the data waveform slope control module 28. The overheat protection module 22 is coupled to the driver 21 and is configured to provide an overheat protection mechanism. The overheat protection mechanism is triggered to disable the driver 21 when a surface temperature of the driver 21 reaches approximately 170 degrees Celsius.

The first switch 23 includes a P-type MOSFET. The source of the P-type MOSFET is coupled to a working voltage $V_{DD}$. The second switch 25 includes an N-type MOSFET. The source of the N-type MOSFET is coupled to the ground. The gates of the MOSFETs are coupled to the driver 21.

The first isolator 27 includes a first diode. The first isolator 27 is external to the transceiving unit 26. Moreover, the first isolator 27 is coupled between the first switch 23 of the transceiving unit 26 and the CANH channel. The first isolator 27 is configured to isolate a spike current coming from the CANH channel.

The second isolator 29 includes a second diode. The second isolator 29 is external to the transceiving unit 26. Moreover, the second isolator 29 is coupled between the second switch 25 of the transceiving unit 26 and the CANL channel. The second isolator 29 is configured to direct a spike current coming from the CANL channel via the second switch 25 to ground.

As shown in FIG. 3, the anode of the first diode is coupled to the drain of the P-type MOSFET, and the cathode of the first diode is coupled to the CANH channel of the bus 11. Moreover, the anode of the second diode is coupled to the CANL channel of the bus 11 and the cathode of the second diode is coupled to the drain of the N-type MOSFET. The first diode and the second diode are configured to provide a protection mechanism to the transceiving module 12. The protection mechanism prevents the P-type MOSFET and the N-type MOSFET from being damaged by a spike current from the bus 11. Specifically, a positive spike current is isolated by the first diode 27, and a negative spike current is directed to ground via the second diode 29.

In normal operation, also referring to FIG. 1, the MCU 13 transmits a working signal to the control module 14. The control module 14 transmits a control data signal in response to the working signal to the data waveform slop control module 28. The data waveform slop control module 28 is configured to modify the waveform of the control data signal and output a modified control data signal to the driver 21.

Meanwhile, the wake-up control module 80 outputs a signal with a high logic level to the data waveform slop control module 28 in order to maintain the working ability of the data waveform slop control module 28. In some embodiments, the driver 21 outputs a signal with a low logic level to the P-type MOSFET and a signal with a high logic level to the N-type MOSFET in order to turn on the MOSFETs. As the P-type MOSFET is turned on, the CANH channel and an input terminal of the normal mode comparing unit 243 are pulled up to approximately the working voltage $V_{DD}$ via the conducted P-type MOSFET and the first isolator 27.

In addition, the negative voltage signal on the CANL channel of the bus 11 is transmitted to another input terminal of the normal mode comparing unit 243. In some embodiments, the normal mode comparing unit 243 includes an operational amplifier.

The working voltage $V_{DD}$ and the negative voltage signal are compared by the normal mode comparing unit 243. A signal with a logic level is then generated in response to the comparison result and transmitted to the control module 14. The control module 14 generates a control signal in response to the signal with a logic level and transmits the control signal to the MCU 13.

Figure 4A:
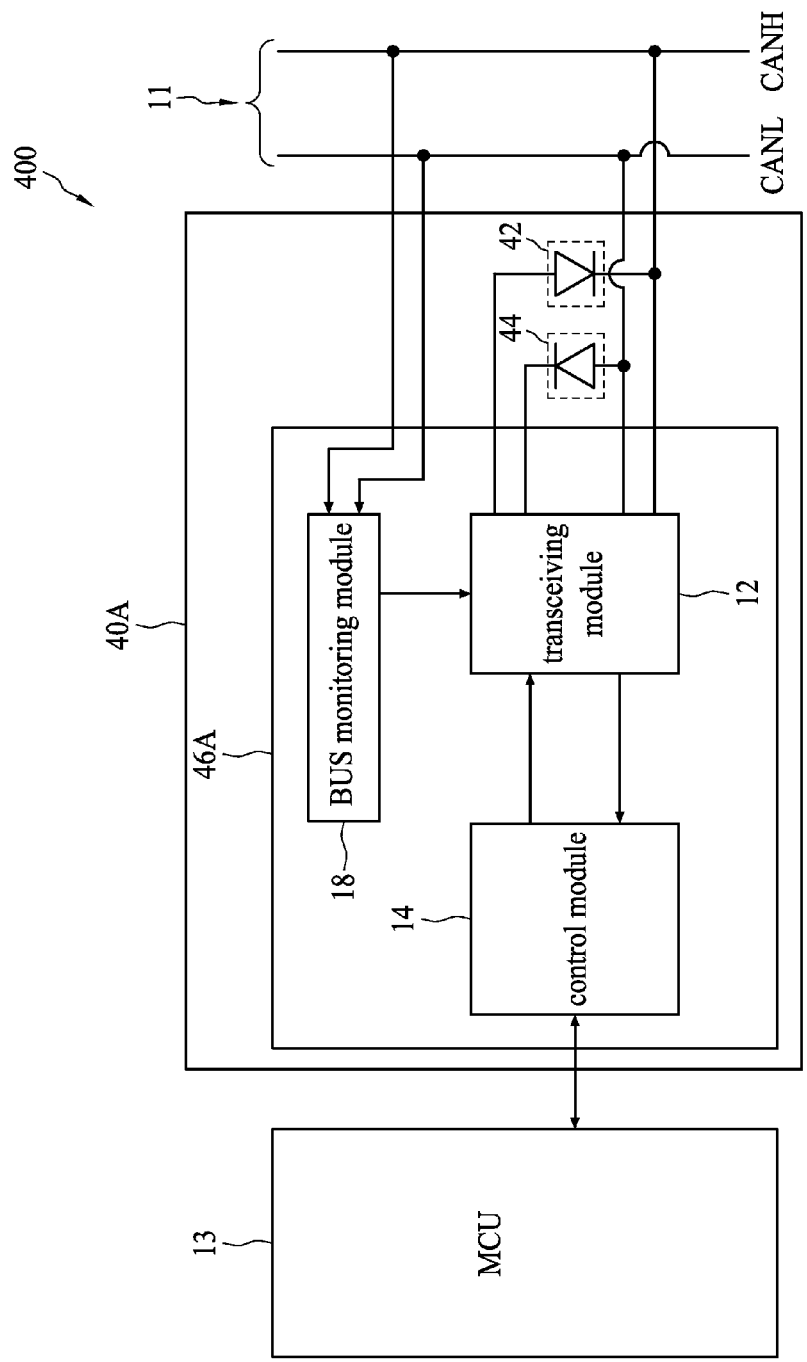
FIG. 4A is a schematic diagram of a communication system in accordance with some embodiments.

FIG. 4A is a schematic diagram of a communication system 400 in accordance with some embodiments. Referring to FIG. 4A, the communication system 400 includes an electronic device 40A coupled between the MCU 13 and the bus 11. The electronic device 40A includes a transceiver 46A, a first isolator 42 and a second isolator 44. The transceiver 46A is similar to the electronic device 10 described and illustrated with reference to FIG. 1 except that, for example, the switch 16 is eliminated. Moreover, the first isolator 42 and the second isolator 44 are similar to the first isolator 27 and the second isolator 29 described and illustrated with reference to FIG. 2, respectively.

In some embodiments, the control module 14 and the transceiving module 12 are integrated by, for example, a complementary metal-oxide-semiconductor (CMOS) process, into an integrated circuit (IC) or a chip. In some embodiments, the transceiver 46A, including the control module 14 and the transceiving module 12, is formed in an integrated circuit or a chip. The CMOS process includes the use of, for example, a poly-silicon layer and four metal layers for 0.18 to 0.25 micrometer (μm) and 1.8 to 40 volts (V) applications.

The transceiver 46A is coupled to the bus 11 via the first isolator 42 and the second isolator 44. The first isolator 42 and the second isolator 42 are disposed externally to the integrated control module 14 and transceiving module 12 of the transceiver 46A, and are not integrated in the IC or chip of the control module 14 and the transceiving module 12. In some embodiments, the transceiver 46A is formed in an IC and the first isolator 42 and the second isolator 42 are disposed externally to the transceiver 46A.

In some existing approaches, transceiving modules are integrated with isolators. However, in this way, it is required to adopt a special process to integrate the isolators and the transceiving modules so as to prevent leakage current of the isolators. In contrast, in the embodiments of the present disclosure, the transceiving module 12 is not integrated with the first isolator 42 or the second isolator 44, and therefore there is no need to adopt the special process.

Figure 4B:
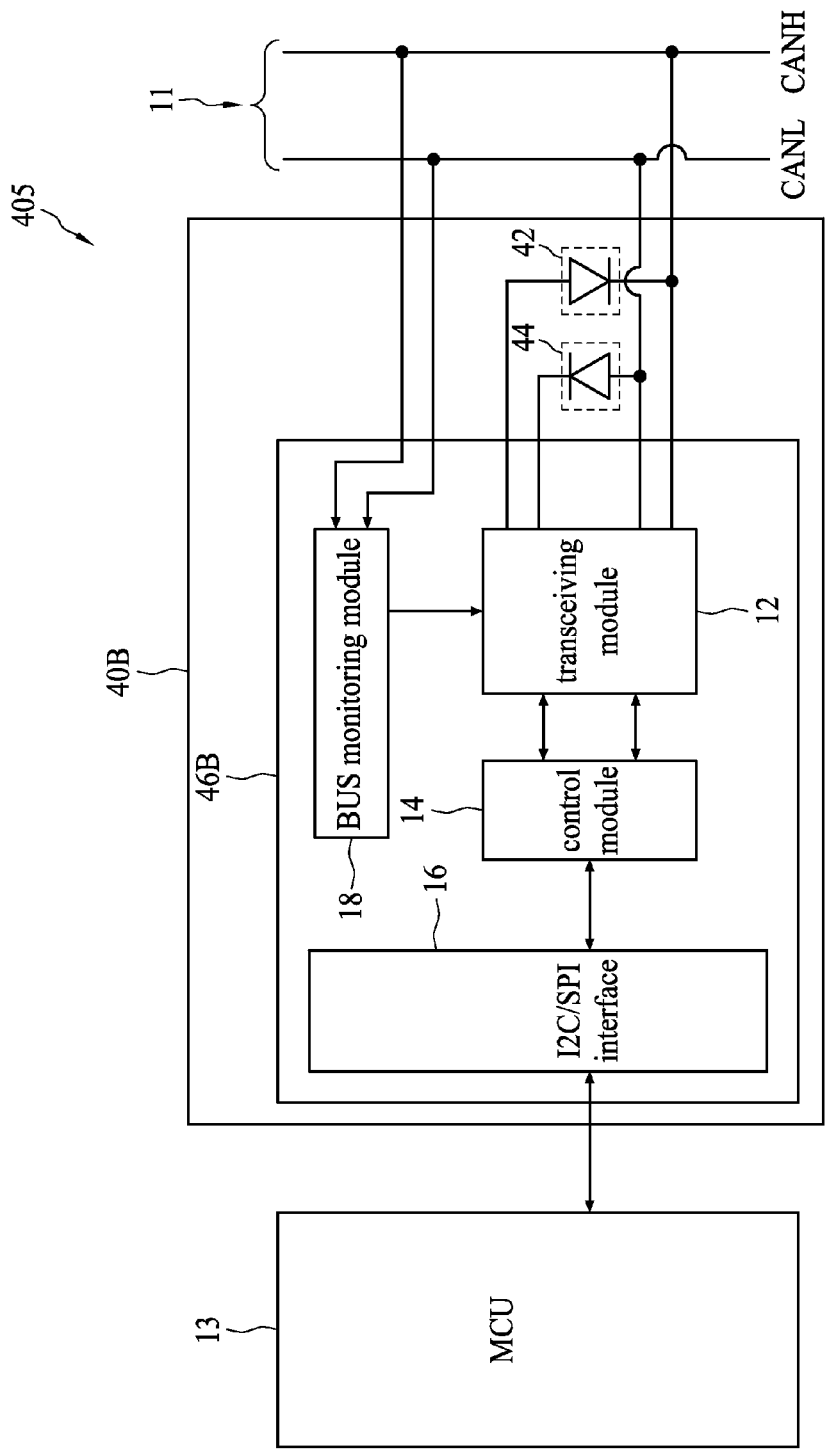
FIG. 4B is a schematic diagram of another communication system in accordance with some embodiments.

FIG. 4B is a schematic diagram of another communication system 405 in accordance with some embodiments. Referring to FIG. 4B, the communication system 405 includes an electronic device 40B coupled between the MCU 13 and the bus 11. The electronic device 40B is similar to the electronic device 40A described and illustrated with reference to FIG. 4A except that, for example, the electronic device 40B includes a transceiver 46B further including a Serial Peripheral Interface (SPI) interface or an Inter-Integrated Circuit ($I^2C$) interface. Due to integration of the control module 14 and the transceiving module 12 in a single chip, the SPI or $I^2C$ interface can be adopted for communications between the MCU 13 and the electronic device 40B. The SPI/$I^2C$ interface 16 allows the MCU 13 to access the integrated control module 14 and transceiving module 12, and provides flexibility and versatility in the selection of the types of MCUs.

Additionally, due to the integration of the control module 14 and the transceiving module 12, interface signals between the control module 14 and the transceiving module 12 are now transmitted internally within the chip. As a result, controlling and monitoring of the transceiving module 14 can be done by the controller module 14 and is no more limited by the number of package pins. Moreover, the software or MCU that would otherwise be updated in the existing approaches can still be used in the communication system 405, and thus the electronic device 40B becomes more cost effective.

Figure 4C:
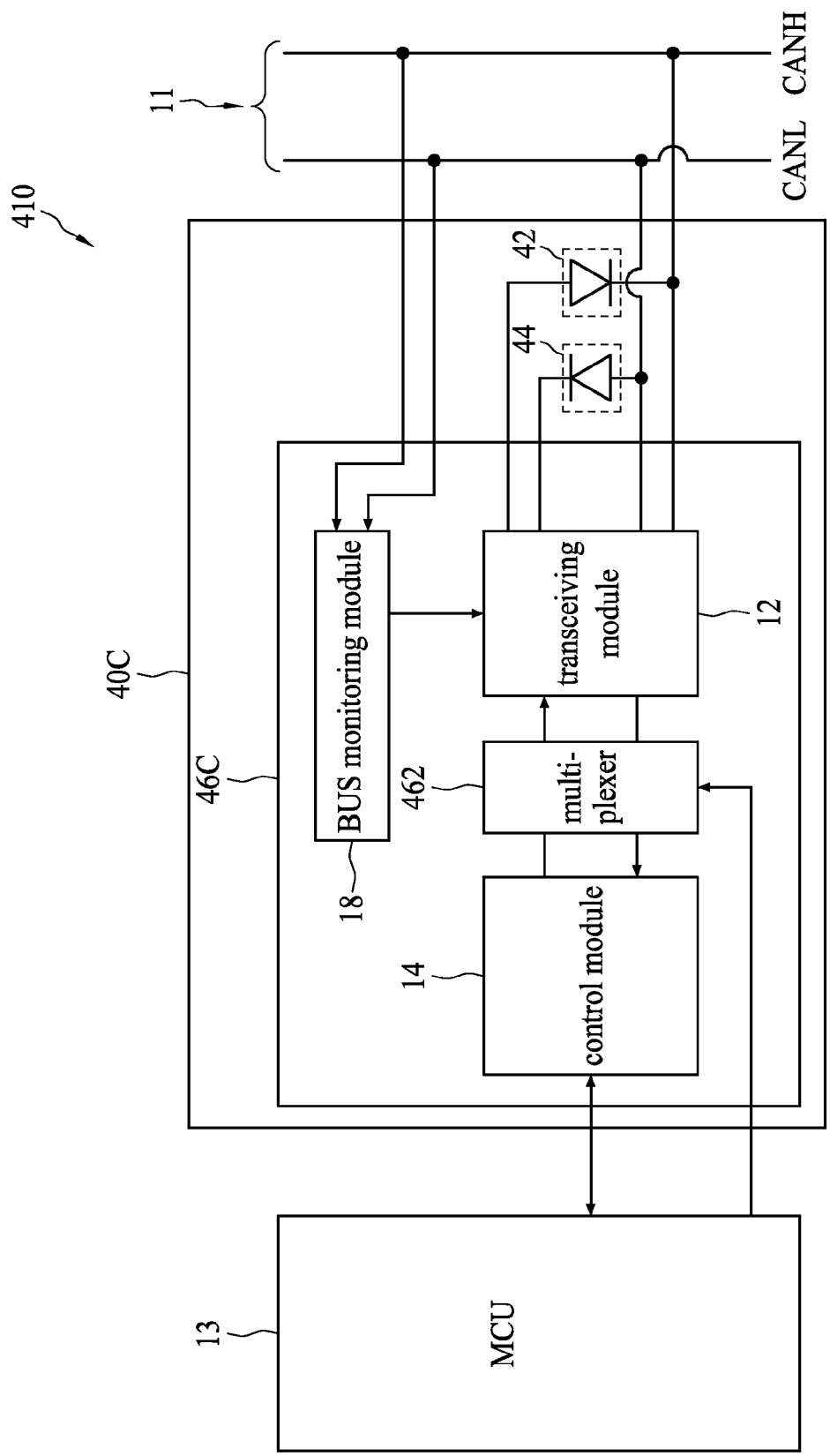
FIG. 4C is a schematic diagram of yet another communication system in accordance with some embodiments.

FIG. 4C is a schematic diagram of yet another communication system 410 in accordance with some embodiments. Referring to FIG. 4C, the communication system 410 includes an electronic device 40C coupled between the MCU 13 and the bus 11. The electronic device 40C is similar to the electronic device 40A described and illustrated with reference to FIG. 4A except that, for example, the electronic device 40C includes a transceiver 46C that further includes a multiplexer 462.

The multiplexer 462 is coupled between the control module 14 and the transceiving module 12. In an embodiment, the control module 14, the multiplexer 462 and the transceiving module 12 are integrated in an IC or chip. In another embodiment, the transceiver 46C is formed in an IC or chip. In either of the embodiments, the first isolator 42 and the second isolator 44 are disposed externally to the IC or chip. The multiplexer 462 is configured to, in response to a signal from the MCU 13, select a signal transmission path between the control module 14 and the transceiving module 12. Operation of the multiplexer 462 is described in detail with reference to FIGS. 5A-5C below.

Figure 5A:
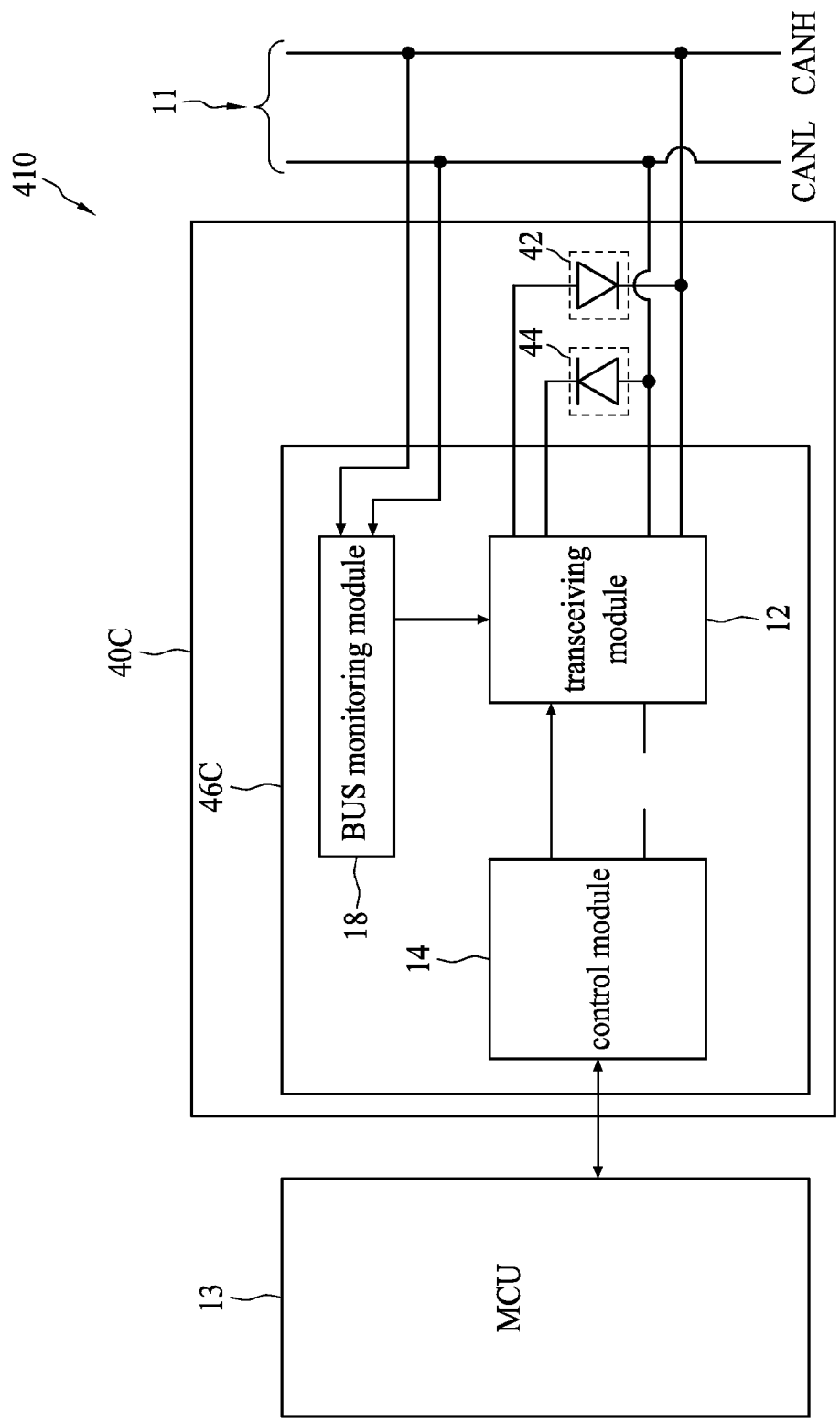
FIGS. 5A-5C are schematic diagrams illustrating operation of a multiplexer in the communication system illustrated in FIG. 4B, in accordance with some embodiments.
Figure 5B:
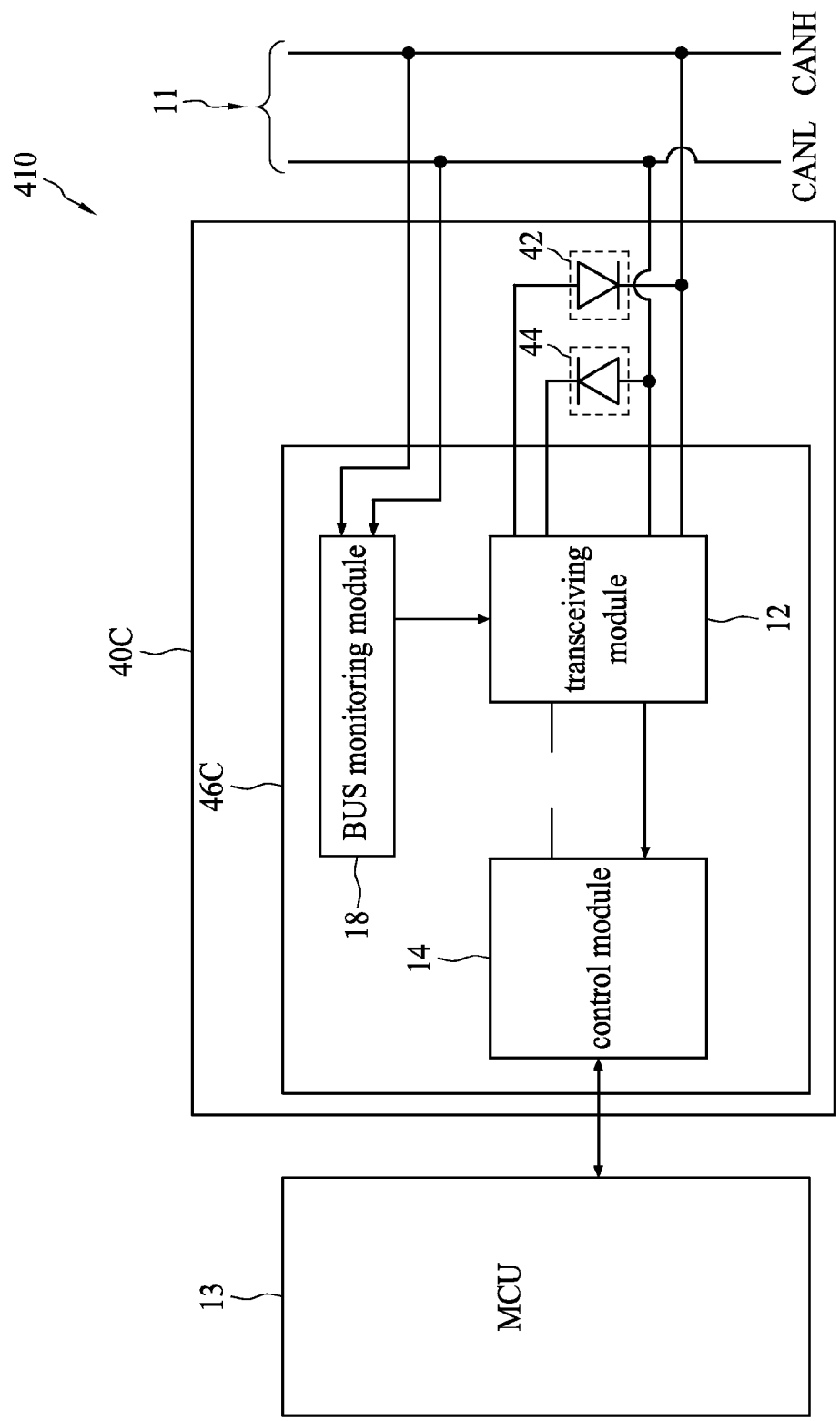
Figure 5C:
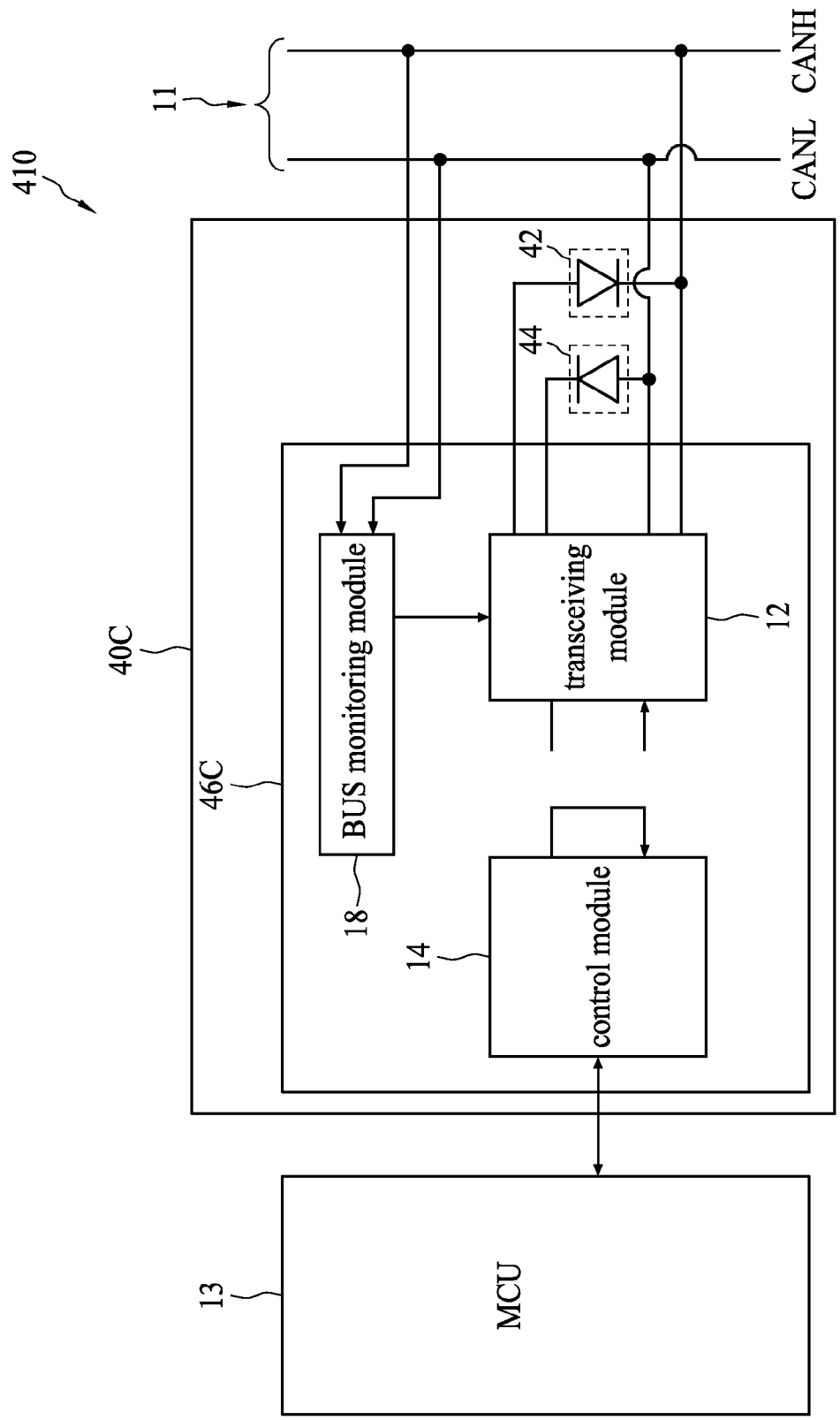

FIGS. 5A-5C are schematic diagrams illustrating operation of the multiplexer 462 of FIG. 4C, in accordance with some embodiments. Referring to FIG. 5A, the multiplexer 462, in response to a signal from the MCU 13, establishes a signal transmission path from the control module 14 to the transceiving module 12, and inhibits signal transmission from the transceiving module 12 to the control module 14.

Referring to FIG. 5B, the multiplexer 462, in response to a signal from the MCU 13, establishes a signal transmission path from the transceiving module 12 to the control module 14, and inhibits signal transmission from the control module 14 to the transceiving module 12.

Referring to FIG. 5C, when the transceiving function of the electronic device 40C is found abnormal due to, for example, a missing acknowledgement of an electrical signal transmitted by the control module 14, the MCU 13 outputs a signal to the multiplexer 462. In response to the signal, the multiplexer 462 establishes a signal loop for testing the control module 14.

Figure 6A:
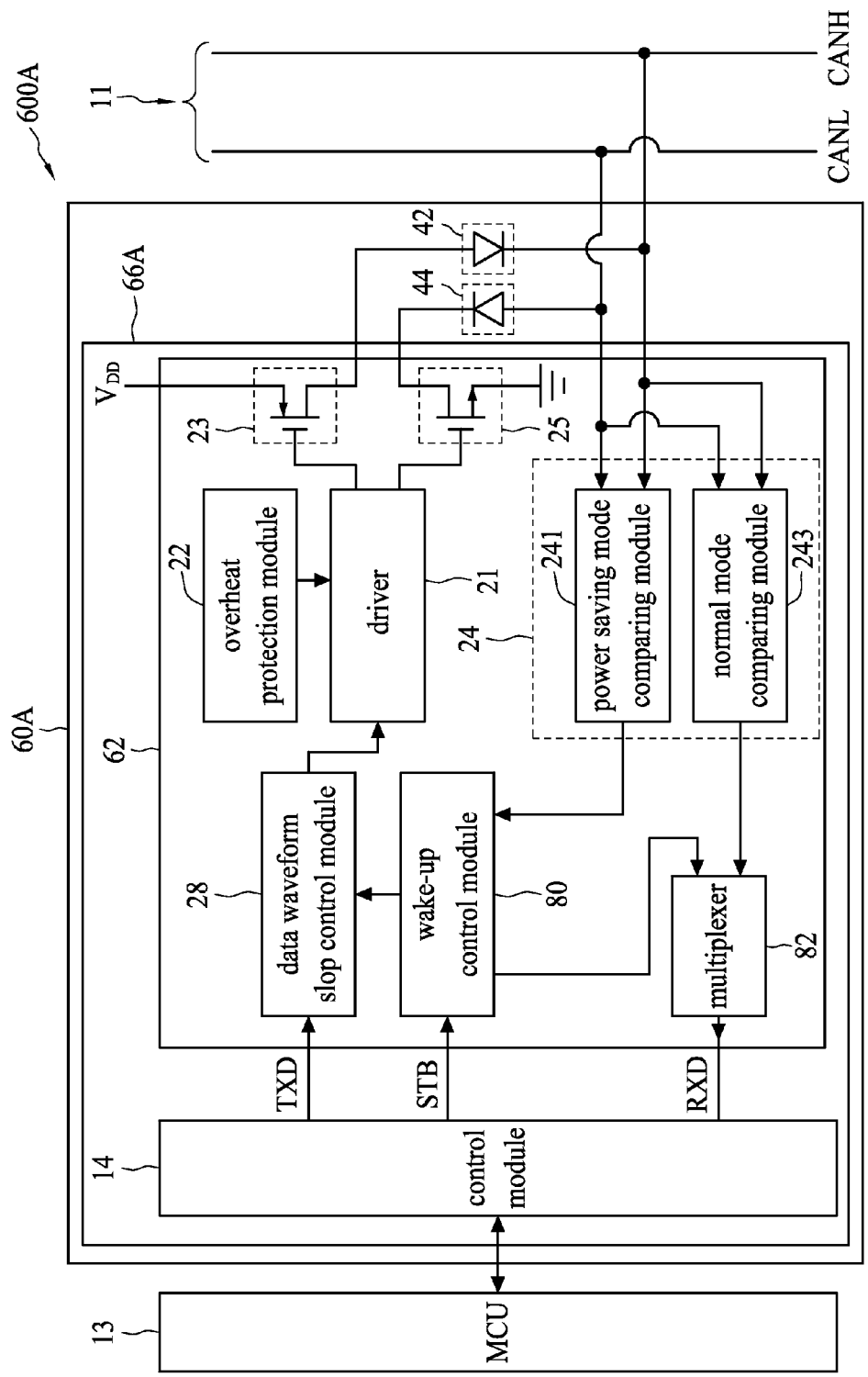
FIG. 6A is a schematic diagram of still another communication system in accordance with some embodiments.

FIG. 6A is a schematic diagram of a communication system 600A in accordance with some embodiments. Referring to FIG. 6A, the communication system 600A includes an electronic device 60A coupled between the MCU 13 and the bus 11. The electronic device 60A includes a transceiver 66, which further includes a transceiving module 62 and the control module 14. The transceiving module 62 is similar to the transceiving unit 26 described and illustrated with reference to FIG. 2. In some embodiments, the transceiving module 62 and the control module 14 are formed in an IC or chip, while the first isolator 42 and the second isolator 44 are disposed externally to the chip.

Figure 6B:
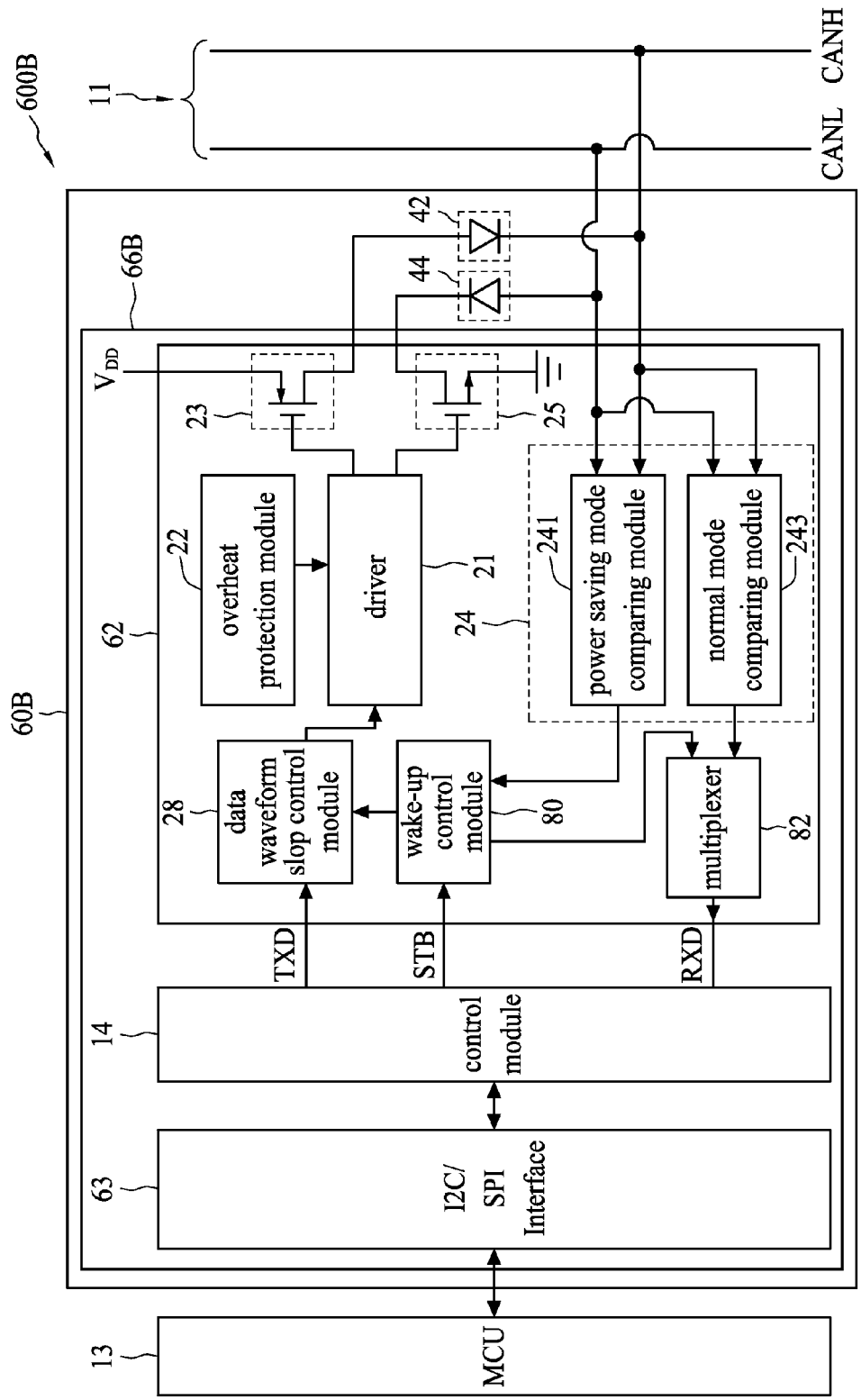
FIG. 6B is a schematic diagram of yet still another communication system in accordance with some embodiments.

FIG. 6B is a schematic diagram of yet still another communication system 600B in accordance with some embodiments. Referring to FIG. 6B, the communication system 600B includes an electronic device 60B coupled between the MCU 13 and the bus 11. The electronic device 60B is similar to the electronic device 60A described and illustrated with reference to FIG. 6A except that, for example, the electronic device 60B includes a transceiver 66B, which further includes a SPI or I2C interface 63.

Figure 7A:
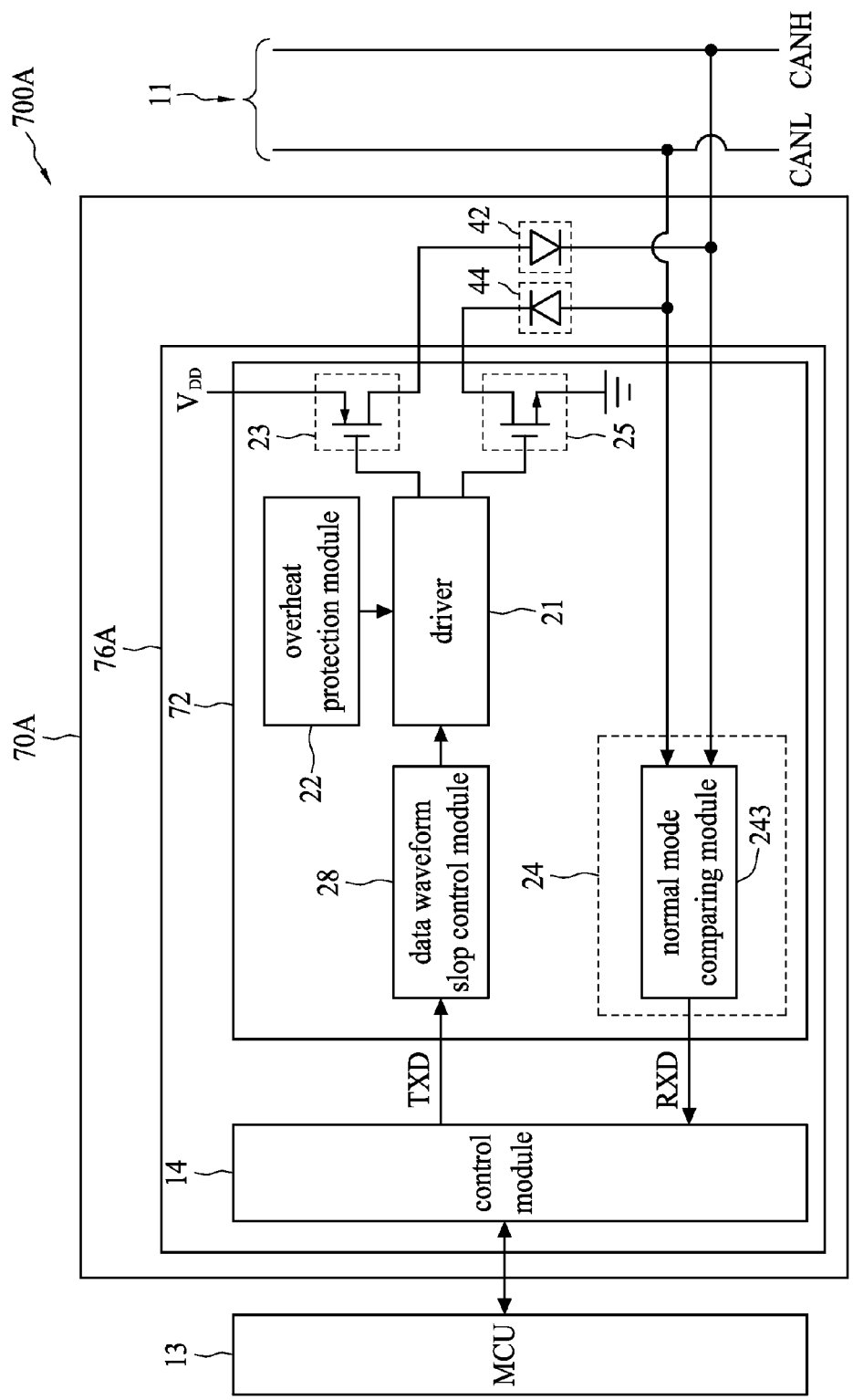
FIG. 7A is a schematic diagram of another communication system in accordance with some embodiments.

FIG. 7A is a schematic diagram of further another communication system 700A in accordance with some embodiments. Referring to FIG. 7A, the communication system 700A includes an electronic device 70A coupled between the MCU 13 and the bus 11. The electronic device 70A includes a transceiver 76A, which further includes a transceiving module 72 and the control module 14. The transceiving module 72 is similar to the transceiving unit 26' described and illustrated with reference to FIG. 3. In some embodiments, the transceiving module 72 and the control module 14 are formed in an IC or chip, while the first isolator 42 and the second isolator 44 are disposed externally to the chip.

Figure 7B:
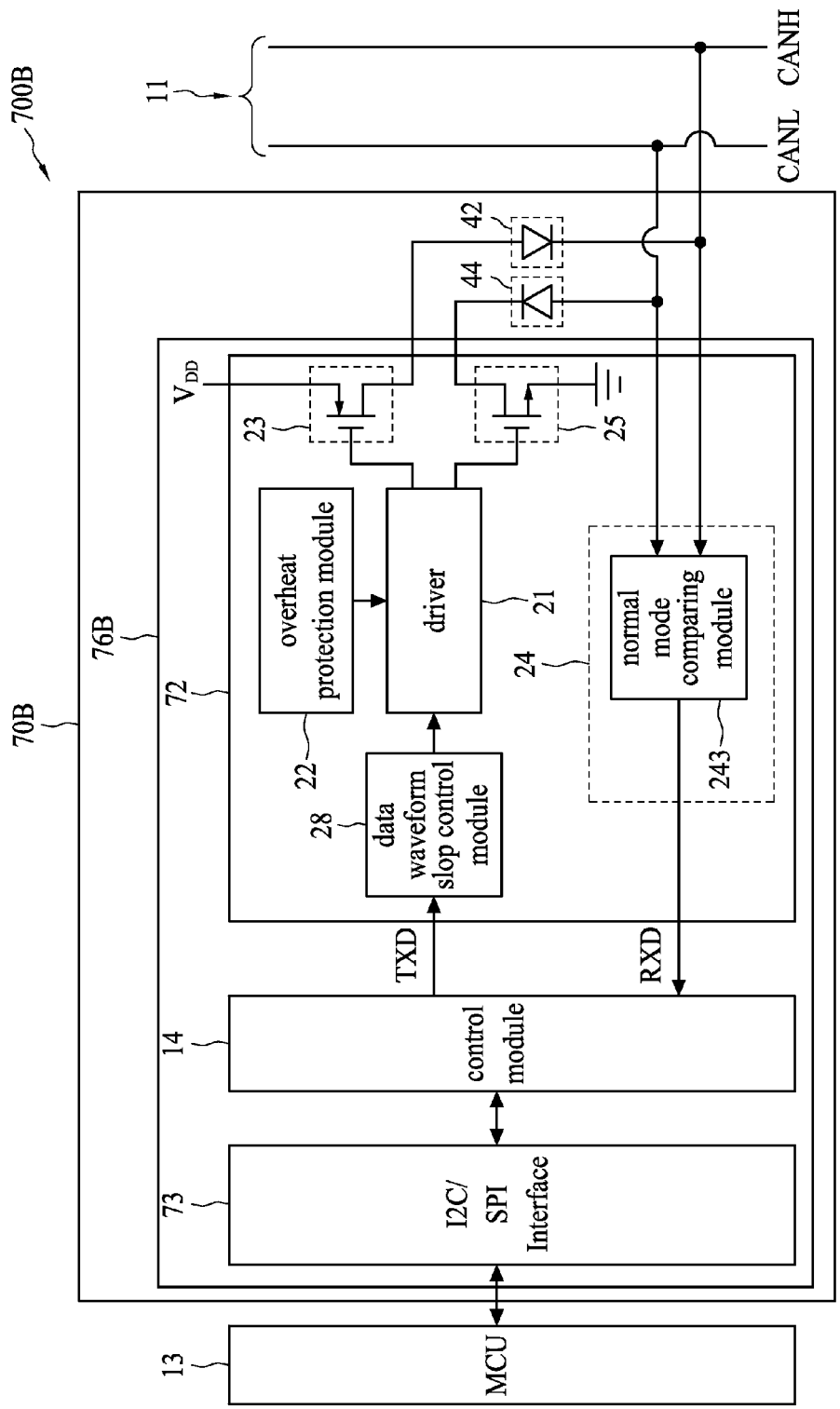
FIG. 7B is a schematic diagram of still another communication system in accordance with some embodiments.

FIG. 7B is a schematic diagram of still further another communication system 700B in accordance with some embodiments. The communication system 700B includes an electronic device 70B coupled between the MCU 13 and the bus 11. The electronic device 70B is similar to the electronic device 70A described and illustrated with reference to FIG. 7A except that, for example, the electronic device 70B includes a transceiver 76B, which further includes a SPI or I2C interface 73.

A number of embodiments of the disclosure have been described. It will nevertheless be understood that various modifications may be made without departing from the spirit and scope of the disclosure. Embodiments of the disclosure are applicable in various design choices.

The above description includes exemplary operations, but these operations are not necessarily required to be performed in the order shown. Operations may be added, replaced, changed order, and/or eliminated as appropriate, in accordance with the spirit and scope of the disclosure. Accordingly, the scope of the disclosure should be determined with reference to the following claims, along with the full scope of equivalences to which such claims are entitled.

What is claimed is:

1. A transceiver, comprising:
a control module, configured to generate a control signal in response to a signal from a micro-control unit; and
a transceiving module, integrated with the control module, and configured to, in response to the control signal, broadcast a first electrical signal to a bus and receive a second electrical signal from the bus,
wherein the transceiving module and the control module are integrated in the transceiver, and the transceiver is separated from the micro-control unit;
wherein the transceiver is coupled to the bus via a first isolator, and the first isolator is disposed externally to the integrated control module and transceiving module;
wherein the transceiving module includes a first switch;
wherein the first isolator is coupled between the first switch and the bus, and is configured to isolate a first spike current sent over the bus.

2. The transceiver of claim 1, wherein the transceiver is coupled to the bus via a second isolator, and the second isolator is disposed externally to the integrated control module and transceiving module.

3. The transceiver of claim 2, wherein the transceiving module further includes a second switch.

4. The transceiver of claim 3, wherein the first switch includes a first transistor, and the second switch includes a second transistor.

5. The transceiver of claim 3, wherein the second isolator is coupled between the second switch and the bus, and is configured to direct a second spike current to ground.

6. The transceiver of claim 3, wherein the first isolator includes a diode, which includes an anode coupled to the first switch and a cathode coupled to the bus.

7. The transceiver of claim 3, wherein the second isolator includes a diode, which includes an anode coupled to the bus and a cathode coupled to the second switch.

8. The transceiver of claim 1 further including a multiplexer, coupled between the control module and the transceiving module, and configured to select a signal transmission direction between the control module and the transceiving module.

9. The transceiver of claim 1, wherein the transceiving module includes an overheat protection module coupled to a driver.

10. The transceiver of claim 9, wherein the overheat protection module is configured to disable the driver when the driver reaches a temperature threshold.

11. An electronic device, comprising:
a transceiver, comprising:
a control module, configured to generate a control signal in response to a signal from a micro-control unit; and
a transceiving module, integrated with the control module, and configured to, in response to the control signal, broadcast a first electrical signal to a bus and receive a second electrical signal from the bus;

a first isolator, disposed externally to the integrated control module and transceiving module, and coupled between the transceiver and the bus to isolate a first spike current sent over the bus; and wherein the transceiving module includes a first switch;

wherein the first isolator is coupled between the first switch and the bus;

a second isolator, disposed externally to the integrated control module and transceiving module, and coupled between the transceiver and the bus to direct a second spike current to ground, wherein the transceiving module and the control module are integrated in the transceiver, and the transceiver is separated from the micro-control unit.

12. The electronic device of claim 11, wherein the transceiver further includes a second switch.

13. The electronic device of claim 12, wherein the second switch includes a second transistor.

14. The electronic device of claim 12, wherein the first isolator includes a diode, which includes an anode coupled to the first switch and a cathode coupled to the bus.

15. The electronic device of claim 12, wherein the second isolator includes a diode, which includes an anode coupled to the bus and a cathode coupled to the second switch.

16. The electronic device of claim 11 further including a multiplexer, coupled between the control module and the transceiving module, and configured to select a signal transmission direction between the control module and the transceiving module.

17. The electronic device of claim 16, wherein the multiplexer is configured to establish a signal loop for testing the control module in response to a signal from the micro-control unit.

18. The electronic device of claim 11, wherein the transceiving module includes an overheat protection module coupled to a driver.

19. The electronic device of claim 18, wherein the overheat protection module is configured to disable the driver when the driver reaches a temperature threshold.

20. A transceiver, comprising:

a control module, configured to generate a control signal in response to a signal from a micro-control unit external to the transceiver; and a transceiving module, integrated with the control module, and configured to, in response to the control signal, broadcast a first electrical signal to a bus and receive a second electrical signal from the bus, wherein the transceiving module and the control module are integrated in the transceiver, and the transceiver is separated from the micro-control unit.

* * * * *